United States Patent Office 3,657,305
Patented Apr. 18, 1972

3,657,305
SILOXANE-POLYOXYALKYLENE BLOCK COPOLYMERS CONTAINING ARALKYL GROUPS
Edward L. Morehouse, 7 Wren Lane,
New City, N.Y. 10956
No Drawing. Filed Dec. 24, 1969, Ser. No. 888,033
Int. Cl. C07f 7/02
U.S. Cl. 260—448.2 B
6 Claims

ABSTRACT OF THE DISCLOSURE

This invention relates to novel siloxane-polyoxyalkylene block copolymers containing silicon-bonded aralkyl groups. The novel block copolymers are useful as foam stabilizers in the production of polyurethane foams, especially in the production of open-cell flexible polyether polyurethane foams having reduced flammability.

---

Open-cell flexible polyether polyurethane foams are produced commercially by the one-shot process from reaction mixtures containing a polyether polyurethane-foaming reactant (e.g., an organic polyisocyanate and a polyether polyol), a blowing agent and a siloxane-polyoxyalkylene block copolymer foam stabilizer. Such foams are, to some extent, flammable and are used in applications (e.g., automobile seat cushions and household furniture cushions) where fire creates a hazard. Accordingly it is desirable to reduce the flammability of such foams.

This invention is based, in part, on the discovery that siloxane-polyoxyalkylene block copolymers modified by the incorporation of certain organic groups therein can be used in producing open-cell flexible polyether polyurethane foam of reduced flammability. The organic groups which produce this effect in the block copolymers of this invention are silicon-bonded aralkyl groups.

More specifically, this invention provides siloxane-polyoxyalkylene block copolymers consisting essentially of:

(A) at least one siloxane block consisting essentially of siloxane units having the formula:

(1)

wherein $a$ is an integer that has a value from 1 to 3 inclusive, R is a methyl group, a divalent atom or a divalent group linking the siloxane block to a polyoxyalkylene block, or an aralkyl group having the formula:

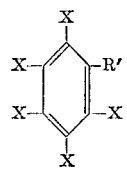

(2)

X is hydrogen, alkyl, haloalkyl or halogen, R' is an alkylene group, at least one R group in the siloxane block is said divalent atom or said divalent group and at least one R group in the siloxane block is an aralkyl group as defined above, and (B) at least one polyoxyalkylene block consisting essentially of oxyalkylene units each polyoxyalkylene block being bonded to a siloxane block by a divalent atom or a divalent organic group represented by R. Preferably, aralkyl groups represent from 2 to 16 weight percent of the block copolymer and the siloxane blocks represent from 20 to 50 weight percent of the block copolymer. Preferably, each aralkyl group contains no more than 12 carbon atoms.

Illustrative of the aralkyl groups represented by Formula 2 above are the benzyl, beta-phenylethyl, beta-phenylpropyl, gamma-phenylpropyl, delta-phenylbutyl, beta-phenylbutyl, ortho-methyl-phenylethyl, 3,5-dimethyl-phenylethyl, para-tertiarybutyl-phenylethyl, para-ethyl-phenylethyl, m-trifluoromethyl phenylethyl and 2,4-dimethyl-phenylethyl as well as the nuclear chlorinated and brominated derivatives thereof.

The chemical bond between the siloxane block and the polyoxyalkylene block in the block copolymers of this invention can be provided by any suitable divalent atom or divalent organic group [R in Formula 1 above] such as the following: —O—, —S—, —NR—, —R°°—, —R°°O— and

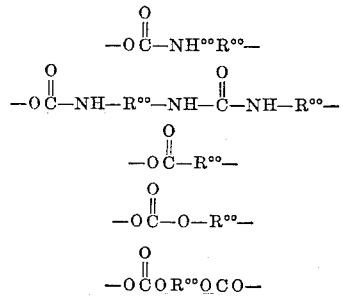

wherein the valence on the left is bonded to a carbon atom of an oxyalkylene unit in the oxyalkylene block, the valence on the right is bonded to the silicon atom in the siloxane unit represented by Formula 1, R is a monovalent hydrocarbon group or hydrogen and R°° is a divalent hydrocarbon group. Typical of such divalent hydrocarbon groups (R or R°°) are the alkylene groups (e.g., the methylene, ethylene, propylene, and butylene groups) and the arylene groups, (e.g., the ortho, meta and para phenylene groups).

In the above formulas, the symbols representing the numbers and types of groups need not have the same meaning at each occurrence throughout the composition. For example, in a given block copolymer having groups represented by Formula 1 above, some of such groups can be dimethylsiloxane groups while other of such groups can be methylsiloxane groups and/or trimethylsiloxane groups. At least one aralkylsiloxane group must be present.

The critical aralkylsiloxane units can be incorporated in the block copolymers of this invention by any suitable method. By one method (Method 1), a mixture containing (A) a silane having one or more hydrolyzable groups, a group reactive with a reactive polyoxyalkylene polymer and one or more methyl groups bonded to silicon and (B) a silane having one or more hydrolyzable groups and one or more aralkyl groups bonded to silicon can be cohydrolyzed and cocondensed to produce a siloxane which can then be reacted with a reactive polyoxyalkylene polymer to produce the block copolymer. By another method (Method 2), a siloxane containing methyl groups and groups reactive with both (I) a reactive polyoxyalkylene polymer and (II) a precursor for the aralkyl groups can be reacted with (I) and (II) to produce the block copolymer. In the latter method, (I) and (II) can be reacted with the siloxane concurrently or in any sequence. By a third method (Method 3), a siloxane containing silicon-bonded methyl groups and groups reactive with a reactive polyoxyalkylene polymer can be equilibrated with a siloxane containing silicon-bonded aralkyl groups to produce a siloxane containing these various groups. The latter siloxane can then be reacted with a reactive polyoxyalkylene polymer to produce the block copolymer. By way of illustrating Method 1, a mixture of methyldichlorosilane (MeSiHCl₂), dimethyldichlorosilane (Me₂SiCl₂)

trimethylchlorosilane (Me₃SiCl) and beta-phenylethyl (methyl)dichlorosilane (C₆H₅CH₂CH₂SiMeCl₂) can be cohydrolyzed and cocondensed to produce a siloxane which then can be reacted with an alkenyl endblocked polyoxyalkylene polymer in the presence of an addition catalyst (e.g., chloroplatinic acid) to produce the block copolymer. By way of illustrating Method 2, a siloxane having the formula Me₃SiO(Me₂SiO)ᵣ(MeSiHO)ₛSiMe₃ where r and s are integers can be reacted with an alkenyl end blocked polyoxyalkylene polymer and an aralkenyl compound (e.g., styrene or alpha-methylstyrene) in the presence of an addition catalyst to produce the block copolymer. By way of illustrating Method 3, a siloxane having the formula Me₃SiO(Me₂SiO)ᵣ(MeSiHO)ₛSiMe₃ where r and s are integers can be equilibrated with a cyclic siloxane having the formula (aralkyl-SiMeO)ₜ in the presence of an equilibration catalyst to produce a siloxane which then can be reacted with (1) an alkenyl endblocked polyoxyalkylene polymer in the presence of an addition catalyst (e.g., Pt) or (2) a hydroxyl endblocked polyoxyalkylene polymer in the presence of an addition catalyst (e.g., stannous octoate) to produce the block copolymer. Still other methods for incorporating aralkyl-siloxane units in the copolymers will be apparent to those skilled in the art.

As noted above, the block copolymers of this invention can be produced by reacting a reactive polyoxyalkylene polymer with a siloxane having a group reactive with the polyoxyalkylene polymer. In such reactions, the nature of these reactive groups determines the structure of the divalent atom or divalent organic group represented by R in Formula 1 above. These reactions can be illustrated by the following equations:

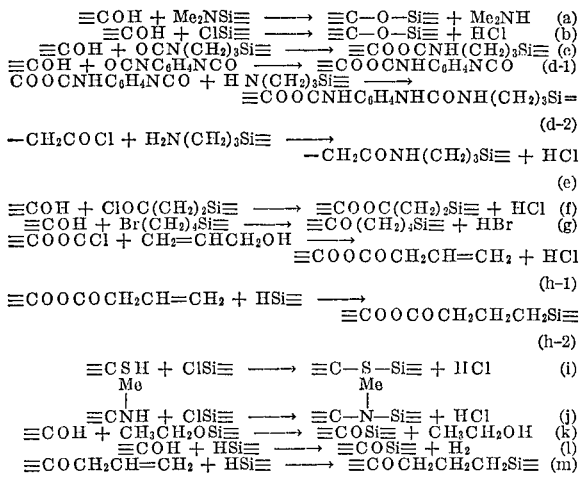

The polyoxyalkylene portions of "blocks" of the siloxane-oxyalkylene block copolymers of this invention are composed of oxyalkylene groups represented by the formula:

$$[—R'O—] \qquad (3)$$

wherein R' is an alkylene group. Preferably each oxyalkylene block contains at least four oxyalkylene groups. Illustrative of the oxyalkylene groups that are represented by Formula 3 are the oxyethylene, oxypropylene, oxy-1,4 - butylene, oxy - 1,5 - amylene, oxy - 2,2 - dimethyl-1,3 - propylene, oxy - 1,10 - decylene groups and the like. The oxyalkylene portion of the copolymers can contain more than one of the various types of oxyalkylene groups represented by Formula 3. By way of illustration, the oxyalkylene blocks can contain only oxyethylene groups or both oxyethylene and oxypropylene groups, or other combinations of oxyethylene groups and the various other types of oxyalkylene groups represented by Formula 3. The oxyalkylene portion of the block copolymers employed in this invention can contain various organic end-blocking or chain terminating groups. By way of illustration, the oxyalkylene blocks can contain such endblocking groups as the hydroxy group, the aryloxy group (such as the phenoxy groups), the alkoxy groups (such as the methoxy, ethoxy, propoxy and butoxy groups), acyloxy groups (e.g., the acetoxy and propionyloxy groups), aralkoxy groups, carbamyl groups, carbonate groups (e.g., —OCOOCH₃) and the like. Also, a single group can serve as an end-blocking group for more than one oxyalkylene chain. For example the glyceroxy group,

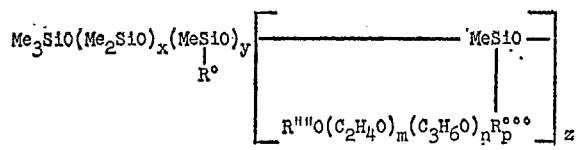

can serve as an end-blocking group for three oxyalkylene chains. Trihydrocarbylsiloxy groups (e.g., trimethylsiloxy groups) can also end-block the oxyalkylene chains. Preferred polyoxyalkylene blocks are those represented by the formula:

$$R''''O(C_2H_4O)_m(C_3H_6O)_n— \qquad (4)$$

wherein R'''' is hydrogen, an alkyl group, or an acyl group, m has a value from 0 to 100, n has a value from 0 to 100 and m+n has a value from 20 to 200.

Preferred block copolymers for use in the process of this invention are represented by the average formula:

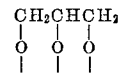

(5)

wherein Me is methyl, R°°° is alkylene or —OC-alkylene or —OCNH-alkylene— (where the free valence of alkylene is attached to the silicon atom), x has a value from 10 to 200, y has a value from 1 to 50, z has a value from 2 to 30, R° is an aralkyl group represented by Formula 2 above (most preferably a phenylethyl or a phenylpropyl group), p is 0 or 1 and R'''', m and n are as defined above for Formula 4.

The block copolymers of this invention are useful as form stabilizers in the production of polyurethane foams. Such foams, especially the open cell flexible polyether polyurethane foams, have reduced flammability as compared to foams produced from block copolymers free of aralkylsiloxane units. A process for producing such foams of reduced flammability is described and claimed in U.S. patent application Serial No. 888,067 of E. L. Morehouse, entitled "Process For Reducing Flammability of Polyurethane Foam," filed Dec. 24, 1969. Moreover, the use of block copolymers containing aralkylsiloxane units entails the further advantage that there is less change in the flammability and breathability of the resulting polyurethane foams with changes in block copolymer concentration. The polyurethane foams produced using the block copolymers of this invention as foam stabilizers can be used in the same areas and for the same purposes as conventional flexible polyether polyurethane foams (e.g., they can be used in cushioning materials for seating and for packaging delicate objects, and as gasketing material). The block copolymers of this invention are also useful as mold release agents, leveling agents for paints and lubricants for glass fibers.

The term "block copolymer" is used herein to denote a material wherein at least one section ("block") of the molecule is composed of recurring monomeric units of one type and at least one other section ("block") of the molecule composed of recurring monomeric units of a different type. The different sections or blocks in the molecule can be arranged in any configuration (e.g., AB, ABA, branched or cyclic). Thus the term "block copolymer" as used herein includes graft copolymers. The block copolymers of this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures. As used herein, "open cell" denotes that a flexible foam has interconnecting cells to the extent required to impart adequate breathability for such end uses of the foam as a cushioning material.

The following examples illustrate the present invention:

EXAMPLE 1

An aralkylsiloxane fluid having the average formula:

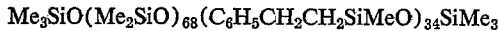

and having a viscosity of about 400 centistokes at 25° C. was prepared by hydrolysis and subsequent condensation of a mixture of the following parts by weight of:

1.0 beta-phenylethylmethyldichlorosilane
1.185 dimethyldichlorosilane
.029 trimethylmonochlorosilane.

A hydrosiloxane was prepared by equilibration of the aralkylsiloxane fluid (127.1 g.), a fluid of average composition $Me_3SiO(MeHSiO)_{38}SiMe_3$ (16.1 g.), $Me_2SiO$ cyclics (101.0 g.) and $Me_3SiOSiMe_3$ (5.8 g.) using an acid catalyst. Contact time was about ten hours at 25° C. at which time a constant viscosity of 159 centistokes had been reached. When a sample of this fluid was treated with KOH in water/ethanol, 23.6 cubic centimeters of hydrogen gas per gram were liberated. The hydrosiloxane fluid had the average structure $$Me_3SiO(Me_2SiO)_{50}(MeHSiO)_6$$
$$(C_6H_5CH_2CH_2—SiMeO)_9SiMe_3$$

A mixture of this hydrosiloxane fluid (14.5 g., 0.015 mole of SiH), a polyether of average structure $$MeO(C_3H_6O)_{29}—(C_2H_4O)_{20}CH_2CH=CH_2$$

(60.5 g., 0.018 mole of allyl), toluene (32 g.) and chloroplatinic acid (25 parts per million platinum based on reactants) was heated rapidly to 90° C. and stirred ten minutes. All SiH had reacted. Sodium bicarbonate (1 g.) was added, the reaction mixture sparged with nitrogen to 130° C. and filtered. The product, a clear amber liquid, had the average structure:

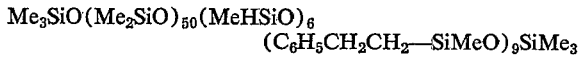

EXAMPLE 2

A solution of a hydrosiloxane of composition $$Me_3SiO(Me_2SiO)_{96}(MeHSiO)_{34}SiMe_3$$

(38.1 g., 0.14 mole of SiH) in toluene (200 g.) was heated to 75° C., chloroplatinic acid (25 parts per million platinum based on reactants) added, then a polyether of composition $MeO(C_3H_6O)_{29}(C_2H_4O)_{20}CH_2CH=CH_2$ (88.4 g., 0.027 mole of allyl) was added dropwise at 75°–92° C. The rate of addition was such that the reaction mixture remained clear. A solution of alpha-methylstyrene (20.0 g. 0.17 mole) in 25 g. of toluene, containing chloroplatinic acid (50 parts per million platinum based on reactants), was added dropwise to the solution of siloxane/polyether copolymer at 90° C. over a period of fifteen minutes. After five hours at this temperature all but a trace of the SiH had reacted. Sodium bicarbonate (2 g.) was added and the reaction mixture sparged with nitrogen at 140° C. to remove solvent and excess alpha-methyl-styrene. The product was a liquid with a viscosity of 4,620 centistokes at 25° C., and had the following average structure:

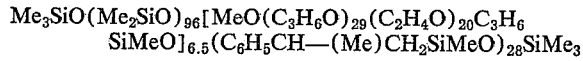

The block copolymers of above Examples 1 and 2 were produced from allyl and methoxy end blocked polyethers. Such polyethers contain up to 10 mol percent of allyl and hydroxyl endblocked polyethers as impurities. Accordingly, the block copolymers produced from the polyethers contained up to 10 mol percent OH endblocking groups and at least 90 mol percent methoxy endblocking groups on the polyoxyalkylene blocks. For convenience, the block copolymers are depicted in the formulas appearing above as though all the endblockers on the polyoxyalkylene blocks are methoxy groups. In addition, the product of Example 1 is shown as having only betaphenylethyl groups. Actually, in view of the process used, some of the groups are alphaphenylethyl groups. In the above examples, "g" represents grams and "Me" represents the methyl group.

What is claimed is:

1. A siloxane-polyoxyalkylene block copolymer having the average formula:

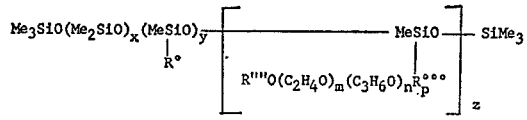

wherein: Me is methyl; R°°° is an alkylene group, an —(O)C-alkylene— or an —(O)CNH-alkylene— group (where the free valence of alkylene is attached to the silicon atom); $x$ has a value from 10 to 200; $y$ has a value from 1 to 50; $z$ has a value from 2 to 30; $p$ is 0 or 1; $m$ has a value from 0 to 100, $n$ has a value from 0 to 100, the sum $m+n$ having a value from 20 to 200; R'''' is hydrogen, an alkyl group or an acyl group; and R° is an aralkyl group having the formula,

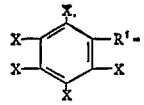

in which X is hydrogen, alkyl, haloalkyl or halogen, and R' is an alkylene group.

2. A block copolymer as defined in claim 1 wherein the aralkyl groups represent from 2 to 16 weight percent of the block copolymer.

3. A block copolymer as defined in claim 2 wherein siloxane blocks represent from 20 to 50 weight percent of the block copolymer.

4. A block copolymer as defined in claim 1 wherein each aralkyl group is a beta-phenylethyl group.

5. A block copolymer as defined in claim 1 wherein each aralkyl group is a beta-phenylpropyl group.

6. A siloxane-polyoxyalkylene block coplymer as defined in claim 1 in which $p$ has a value of one, R°°° is a propylene group and R'''' is a methyl group.

References Cited

UNITED STATES PATENTS 3,505,377    4/1970    Morehouse _____ 260—448.2 B
3,530,159    9/1970    Guinet et al. _____ 260—448.2 B TOBIAS E. LEVOW, Primary Examiner W. F. W. BELLAMY, Assistant Examiner U.S. Cl. X.R.

252—8.05; 260—2.5 AM, 2.5 AJ

UNITED STATES PATENT OFFICE
CERTIFICATE OF CORRECTION

Patent No. 3,657,305      Issue Date April 18, 1972

Inventor(s) Edward L. Morehouse

It is certified that error appears in the above-identified patent and that said Letters Patent are hereby corrected as shown below:

Column 1, in the heading of the patent, after the inventor's name and address, read --, assignor to Union Carbide Corporation, New York, N.Y.--. Column 1, lines 48-55, that portion of the formula reading " -R' " should read -- -R'- --. Columns 3 and 4, lines 32-38, formula (5) should be read immediately after line 31 of column 4. Column 3, line 43, in the formula appearing immediately to the left of the arrow, that portion reading "H N" should read -- $H_2N$ --; line 44, in the formula appearing to the right of the arrow, that portion reading "Si=" should read -- Si≡ --.

Signed and sealed this 10th day of April 1973.

(SEAL)
Attest:

EDWARD M.FLETCHER,JR.
Attesting Officer

ROBERT GOTTSCHALK
Commissioner of Patents